US012693977B2

(12) United States Patent
Alam et al.

(10) Patent No.: US 12,693,977 B2
(45) Date of Patent: Jul. 28, 2026

(54) DYNAMIC INCLUSIVE AND NON-INCLUSIVE CACHING POLICY

(71) Applicant: Intel Corporation, Santa Clara, CA (US)

(72) Inventors: Hanna Alam, Jish (IL); Yuval Bustan, Moshav Mismeret (IL); Tomer Exterman, Petach Tiqwa (IL); Dor Kahana, Ramat Gan (IL); Larisa Novakovsky, Haifa (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 17/708,435

(22) Filed: Mar. 30, 2022

(65) Prior Publication Data

US 2023/0315630 A1     Oct. 5, 2023

(51) Int. Cl.
*G06F 12/08* (2016.01)
*G06F 12/0811* (2016.01)

(52) U.S. Cl.
CPC ...... *G06F 12/0811* (2013.01); *G06F 2212/62* (2013.01)

(58) Field of Classification Search
CPC ............. G06F 12/0811; G06F 2212/62; G06F 11/3037; G06F 12/0804; G06F 12/084; G06F 2201/885; G06F 2212/1008; G06F 2212/1024; G06F 2212/1028; G06F 2212/502; G06N 20/00
USPC ........................................................ 711/122
See application file for complete search history.

(56) References Cited

U.S. PATENT DOCUMENTS

| | | | |
|---|---|---|---|
| 4,352,869 A | 10/1982 | Mellors | |
| 4,412,281 A | 10/1983 | Works | |
| 4,415,969 A | 11/1983 | Bayliss et al. | |
| 5,506,073 A | 4/1996 | Angell et al. | |
| 5,714,279 A | 2/1998 | Zajac, Jr. et al. | |
| 6,009,488 A | 12/1999 | Kavipurapu | |
| 6,427,202 B1 | 7/2002 | Richardson et al. | |
| 6,560,693 B1 | 5/2003 | Puzak et al. | |
| 6,625,694 B2 | 9/2003 | Masri et al. | |

(Continued)

FOREIGN PATENT DOCUMENTS

| | | |
|---|---|---|
| CN | 108011883 A | 5/2018 |
| CN | 114942722 A | 8/2022 |

(Continued)

OTHER PUBLICATIONS

Extended European Search Report, issued by the European Patent Office on Oct. 19, 2022, 16 pages.

(Continued)

*Primary Examiner* — Hua J Song
(74) *Attorney, Agent, or Firm* — Nicholson De Vos Webster & Elliott LLP

(57) ABSTRACT

Methods and apparatus relating to a dynamic inclusive and non-inclusive caching policy are described. In an embodiment, a first cache has a higher level than a second cache. Circuitry determines a caching policy between the first cache and the second cache based on a comparison of a number of active processor cores and a threshold value. The caching policy is one of an inclusive caching policy or a non-inclusive caching policy. Other embodiments are also disclosed and claimed.

25 Claims, 10 Drawing Sheets

(56) References Cited

U.S. PATENT DOCUMENTS

| | | | |
|---|---|---|---|
| 6,678,847 B1 | 1/2004 | Perry et al. | |
| 6,684,298 B1 | 1/2004 | Dwarkadas et al. | |
| 6,687,789 B1 | 2/2004 | Keller et al. | |
| 6,766,442 B1 | 7/2004 | Kahle et al. | |
| 6,779,036 B1 | 8/2004 | Deshpande | |
| 6,826,651 B2 | 11/2004 | Michael et al. | |
| 6,947,047 B1 | 9/2005 | Moy et al. | |
| 7,017,011 B2 | 3/2006 | Lesmanne et al. | |
| 7,096,323 B1 | 8/2006 | Conway et al. | |
| 7,178,013 B1 | 2/2007 | Batcher | |
| 7,844,053 B2 | 11/2010 | Crispin et al. | |
| 8,041,898 B2 | 10/2011 | Moga et al. | |
| 8,392,665 B2 | 3/2013 | Moga et al. | |
| 8,539,212 B1 | 9/2013 | Kang et al. | |
| 9,160,034 B2 | 10/2015 | Kato et al. | |
| 9,164,900 B1 | 10/2015 | Schuttenberg | |
| 9,172,701 B2 | 10/2015 | Burch et al. | |
| 9,223,709 B1 * | 12/2015 | O'Bleness | G06F 12/0864 |
| 9,519,773 B2 | 12/2016 | Patel et al. | |
| 9,940,138 B2 | 4/2018 | Lopez et al. | |
| 10,008,735 B2 | 6/2018 | Ohtomo et al. | |
| 11,085,964 B2 | 8/2021 | Kurts et al. | |
| 11,216,366 B2 | 1/2022 | Durham et al. | |
| 2002/0078331 A1 | 6/2002 | Ju et al. | |
| 2002/0103979 A1 | 8/2002 | Koga | |
| 2002/0116662 A1 | 8/2002 | Hofstee et al. | |
| 2003/0023836 A1 | 1/2003 | Catherwood et al. | |
| 2003/0041212 A1 | 2/2003 | Creta et al. | |
| 2003/0149865 A1 | 8/2003 | Kadambi | |
| 2003/0163649 A1 | 8/2003 | Kapur et al. | |
| 2003/0163679 A1 | 8/2003 | Ganapathy et al. | |
| 2004/0078558 A1 | 4/2004 | Sprangle | |
| 2004/0123043 A1 | 6/2004 | Rotithor et al. | |
| 2004/0151986 A1 | 8/2004 | Park et al. | |
| 2005/0125640 A1 | 6/2005 | Ford et al. | |
| 2005/0198187 A1 | 9/2005 | Tierney et al. | |
| 2005/0198479 A1 | 9/2005 | Bean et al. | |
| 2006/0101209 A1 | 5/2006 | Lais et al. | |
| 2006/0143408 A1 | 6/2006 | Sistla | |
| 2006/0179291 A1 | 8/2006 | Di Gregorio | |
| 2006/0206686 A1 | 9/2006 | Banerjee et al. | |
| 2006/0294344 A1 | 12/2006 | Hsu et al. | |
| 2007/0055826 A1 | 3/2007 | Morton et al. | |
| 2007/0055958 A1 | 3/2007 | Birenheide et al. | |
| 2007/0113059 A1 | 5/2007 | Tran | |
| 2007/0233932 A1 | 10/2007 | Collier et al. | |
| 2008/0059710 A1 | 3/2008 | Handgen et al. | |
| 2008/0162868 A1 | 7/2008 | Glew | |
| 2009/0015589 A1 | 1/2009 | Luick et al. | |
| 2009/0248989 A1 | 10/2009 | Chicheportiche et al. | |
| 2009/0276581 A1 | 11/2009 | Moga et al. | |
| 2010/0275049 A1 | 10/2010 | Balakrishnan et al. | |
| 2010/0332762 A1 | 12/2010 | Moga et al. | |
| 2011/0045355 A1 | 2/2011 | Ichikawa | |
| 2011/0055523 A1 | 3/2011 | Kaplan et al. | |
| 2011/0283124 A1 | 11/2011 | Branover et al. | |
| 2012/0079214 A1 | 3/2012 | Moga et al. | |
| 2012/0131555 A1 | 5/2012 | Hossain et al. | |
| 2012/0159073 A1 | 6/2012 | Jaleel et al. | |
| 2012/0159074 A1 | 6/2012 | Sodhi et al. | |
| 2012/0301796 A1 | 11/2012 | Ohtomo et al. | |
| 2012/0308900 A1 | 12/2012 | Ogasa | |
| 2013/0246709 A1 | 9/2013 | Segelken et al. | |
| 2013/0275724 A1 | 10/2013 | Bharadwaj | |
| 2013/0295464 A1 | 11/2013 | Yanagi et al. | |
| 2014/0195790 A1 | 7/2014 | Merten et al. | |
| 2014/0281239 A1 * | 9/2014 | Novakovsky | G06F 12/0837 711/119 |
| 2014/0297919 A1 | 10/2014 | Nachimuthu et al. | |
| 2015/0127983 A1 | 5/2015 | Trobough et al. | |
| 2015/0147659 A1 | 5/2015 | Kato | |
| 2015/0254186 A1 | 9/2015 | Sugimoto et al. | |
| 2016/0011975 A1 | 1/2016 | Ananthakrishnan et al. | |
| 2016/0103232 A1 | 4/2016 | Ouspenski et al. | |
| 2016/0149259 A1 | 5/2016 | Osada et al. | |
| 2016/0156064 A1 | 6/2016 | Miyashita et al. | |
| 2016/0204467 A1 | 7/2016 | Nogami et al. | |
| 2016/0248119 A1 | 8/2016 | Kato | |
| 2016/0268630 A1 | 9/2016 | Tsukada et al. | |
| 2016/0308210 A1 | 10/2016 | Sakuda et al. | |
| 2016/0342390 A1 | 11/2016 | Giesselmann et al. | |
| 2016/0359193 A1 | 12/2016 | Yi et al. | |
| 2017/0024205 A1 | 1/2017 | Kountanis et al. | |
| 2017/0040637 A1 | 2/2017 | Ceder et al. | |
| 2017/0093567 A1 | 3/2017 | Gopal et al. | |
| 2017/0179481 A1 | 6/2017 | Yamada et al. | |
| 2017/0187066 A1 | 6/2017 | Tsujimura et al. | |
| 2017/0222257 A1 | 8/2017 | Miyashita et al. | |
| 2017/0229734 A1 | 8/2017 | Furukawa et al. | |
| 2017/0243203 A1 | 8/2017 | Bond et al. | |
| 2017/0286254 A1 | 10/2017 | Menon et al. | |
| 2017/0288281 A1 | 10/2017 | Chiang et al. | |
| 2017/0300418 A1 | 10/2017 | Reed et al. | |
| 2017/0344510 A1 | 11/2017 | Park et al. | |
| 2017/0353576 A1 | 12/2017 | Guim Bernat et al. | |
| 2017/0357596 A1 * | 12/2017 | Moyer | G06F 12/0888 |
| 2018/0095752 A1 | 4/2018 | Kudaravalli et al. | |
| 2018/0183065 A1 | 6/2018 | Sasaki | |
| 2018/0269521 A1 | 9/2018 | Ohtomo et al. | |
| 2018/0300238 A1 | 10/2018 | Vembu et al. | |
| 2018/0307438 A1 | 10/2018 | Huang et al. | |
| 2019/0012267 A1 | 1/2019 | Scalabrino et al. | |
| 2019/0042799 A1 | 2/2019 | Durham et al. | |
| 2019/0067736 A1 | 2/2019 | Yoshioka et al. | |
| 2019/0088995 A1 | 3/2019 | Asano et al. | |
| 2019/0095345 A1 | 3/2019 | Zmudzinski et al. | |
| 2019/0095389 A1 | 3/2019 | Barnes et al. | |
| 2019/0097266 A1 | 3/2019 | Yamamoto et al. | |
| 2019/0097818 A1 | 3/2019 | Lu et al. | |
| 2019/0220284 A1 | 7/2019 | Gupta et al. | |
| 2019/0347213 A1 | 11/2019 | Lutz et al. | |
| 2020/0089504 A1 | 3/2020 | Sheikh et al. | |
| 2020/0125501 A1 | 4/2020 | Durham et al. | |
| 2020/0125770 A1 | 4/2020 | LeMay et al. | |
| 2020/0134417 A1 | 4/2020 | Mohapatra et al. | |
| 2020/0159676 A1 | 5/2020 | Durham et al. | |
| 2020/0169383 A1 | 5/2020 | Durham et al. | |
| 2020/0210183 A1 | 7/2020 | Burylov et al. | |
| 2020/0212481 A1 | 7/2020 | Nagamine et al. | |
| 2020/0228137 A1 | 7/2020 | Chinya et al. | |
| 2020/0328454 A1 | 10/2020 | Sakai et al. | |
| 2020/0328455 A1 | 10/2020 | Sakai et al. | |
| 2020/0328457 A1 | 10/2020 | Sakai et al. | |
| 2020/0328460 A1 | 10/2020 | Asano et al. | |
| 2020/0328461 A1 | 10/2020 | Asano et al. | |
| 2020/0328462 A1 | 10/2020 | Asano et al. | |
| 2020/0328464 A1 | 10/2020 | Asano et al. | |
| 2020/0328465 A1 | 10/2020 | Sakaida et al. | |
| 2020/0328468 A1 | 10/2020 | Sakaida et al. | |
| 2020/0328469 A1 | 10/2020 | Asano et al. | |
| 2020/0335817 A1 | 10/2020 | Asano et al. | |
| 2020/0348361 A1 | 11/2020 | Kurts et al. | |
| 2020/0350615 A1 | 11/2020 | Sakaida et al. | |
| 2020/0350622 A1 | 11/2020 | Sakaida et al. | |
| 2020/0371811 A1 | 11/2020 | Govindan et al. | |
| 2020/0379902 A1 | 12/2020 | Durham et al. | |
| 2020/0393557 A1 | 12/2020 | Manneschi | |
| 2020/0410327 A1 | 12/2020 | Chinya et al. | |
| 2021/0004233 A1 | 1/2021 | Kumar et al. | |
| 2021/0042617 A1 | 2/2021 | Chinya et al. | |
| 2021/0096861 A1 | 4/2021 | Wang et al. | |
| 2021/0117197 A1 | 4/2021 | Hsu et al. | |
| 2021/0200546 A1 | 7/2021 | LeMay et al. | |
| 2021/0326139 A1 | 10/2021 | Gupta et al. | |
| 2021/0357222 A1 | 11/2021 | Nair et al. | |
| 2021/0364571 A1 | 11/2021 | Kurts et al. | |
| 2021/0397454 A1 | 12/2021 | Plotnikov et al. | |
| 2022/0058023 A1 | 2/2022 | Lemay et al. | |
| 2022/0091852 A1 | 3/2022 | Gupta et al. | |
| 2022/0100520 A1 | 3/2022 | Pokam et al. | |
| 2022/0206815 A1 | 6/2022 | Wang et al. | |
| 2022/0261509 A1 | 8/2022 | LeMay et al. | |
| 2022/0343029 A1 | 10/2022 | Sultana et al. | |
| 2022/0413715 A1 | 12/2022 | LeMay et al. | |

(56)         References Cited

U.S. PATENT DOCUMENTS

| | | |
|---|---|---|
| 2023/0056699 A1 | 2/2023 | Subramaniam et al. |
| 2023/0091205 A1 | 3/2023 | Moga et al. |
| 2023/0195388 A1 | 6/2023 | Butera et al. |
| 2023/0214325 A1 | 7/2023 | Shukla et al. |
| 2023/0315473 A1 | 10/2023 | Azeem et al. |

FOREIGN PATENT DOCUMENTS

| | | |
|---|---|---|
| CN | 115904504 A | 4/2023 |
| CN | 116266122 A | 6/2023 |
| CN | 116400960 A | 7/2023 |
| EP | 0354774 A2 | 2/1990 |
| EP | 0354774 A3 | 8/1992 |
| EP | 2508985 A1 | 10/2012 |
| EP | 4044027 A2 | 8/2022 |
| EP | 4141654 A1 | 3/2023 |
| EP | 4198717 A1 | 6/2023 |
| EP | 4209915 A1 | 7/2023 |
| EP | 4392868 A1 | 7/2024 |
| GB | 2599006 A | 3/2022 |
| TW | 202328926 A | 7/2023 |
| WO | 2012040731 A2 | 3/2012 |
| WO | 2012040731 A3 | 3/2012 |
| WO | 2021162792 A1 | 8/2021 |
| WO | 2022139850 A1 | 6/2022 |

OTHER PUBLICATIONS

LeMay, Michael "BackupRefPtr Spatial Safety Extension," 8 pages, Feb. 2021.

M. Al-Otoom, E. Forbes, and E. Rotenberg, "Exact: explicit dynamic branch prediction with active updates, " in Proceedings of the 7th ACM international conference on Computing frontiers. ACM, 2010, pp. 165-176.

MiraclePtr and *Scan—preventing exploitation of UaF bugs (BlinkOn 13).

Narasimha Adiga et al, "The IBM z15 High Frequency Mainframe Branch Predictor," ACM/IEEE 47the International Symposium on Computer Architecture (ISCA), 2020, 13 pages.

Rakesh Kumar et al. "Blasting Through The Front-End Bottleneck With Shotgun," ASPLOS'18, Mar. 24-28, 2018, 13 pages.

Sheikh, Rami, James Tuck, and Eric Rotenberg. "Control-Flow Decoupling: An Approach for Timely, Non-speculative Branching," IEEE Transactions on Computers, Oct. 2014.

Shuwen Deng et al., "Leaky Frontends: Micro-Op Cache and Processor Frontend Vulnerabilities," arXiv:2105.12224v1. May 25, 2021, pp. 1-13. [See, e.g., PCT ISR, highlighting pp. 3-4 and figure 1.].

SPEC CPU2006 Platform Settings for Lenovo Systems, downloaded from https://www.spec.org/cpu2006/flags/Lenovo-Platform-Flags-V1.2-SKL-..., on Sep. 7, 2021, 3 pages.

Sudhanshu Shukla et al., "Register File Prefetching," International Symposium on Computer Architecture (ISCA '22). ACM, NewYork, NY, USA, Jun. 18-22, 2022, published Jun. 11, 2022, 14 pages.

Ziad, Mohamed Tarek Ibn, "No-FAT: Architectural Support for Low Overhead Memory Safety Checks," Department of Computer Science, New York, NY, pp. 1-14.

James Bonanno et al., "Two Level Bulk Preload Branch Prediction," IEEE 978-1-4673-5587-2/13, 2013, 12 pages.

Jouppi et al. "In-Datacenter Performance Analysis of a Tensor Processing Unit," 2017 ACM/IEEE 44th Annual International Symposium on Computer Architecture (ISCA), Toronto, ON, 2017, 12 pages.

Notice of Grant for counterpart GB application No. GB2599006 (issued Sep. 13, 2022, 2 pages.

Notice of Grant from counterpart Dutch patent application under No. under No. 2028988, Jul. 27, 2022, 5 pages [with Google Translation].

Sheikh, Rami, James Tuck, and Eric Rotenberg. "Control-flow decoupling." Proceedings of the 2012 45th Annual IEEE/ACM International Symposium on Microarchitecture. IEEE Computer Society, 2012.

Gao, et al. "Address-branch correlation: A novel locality for long latency hard-to-predict branches," High Performance Computer Architecture, HPCA 2008, IEEE 14th International Symposium, Piscataway, New Jersey (Feb. 16, 2008).

Office Action issued on Apr. 4, 2022 for Dutch Patent Application No. 20228988.

Partial European Search Report, issued Jul. 12, 2022, for Application No. 22150649.6, 15 pages.

Written Opinion of the International Searching Authority, issued Oct. 28, 2022, 7 pages.

U.S. Appl. No. 17/409,090, filed Aug. 23, 2021, Kameswar Subramaniam.

U.S. Appl. No. 17/555,174, filed Dec. 17, 2021, William Butera.

U.S. Appl. No. 17/953,486, filed Sep. 27, 2022, Andreas Kleen.

U.S. Appl. No. 17/958,071, filed Sep. 30, 2022, Tsvika Kurts.

Amitabh Das et al., "Secure JTAG Implementation Using Schnorr Protocol," Journal of Electronic Testing, vol. 29, No. 2, pp. 193-209, 2013, 22 pages.

Cheuk Wong, "Analysis of DPA and DEMA Attacks," San Jose State University, Master's Projects, May 2012, 110 pages.

Das et al., "Secure JTAG Implementation Using Schnorr Protocol," Journal of Electronic Testing, vol. 29, No. 2, 2013, 22 pages.

Dixit et al., "silent data corruptions at scale," arXiv:2102.11245v1, Feb. 22, 2021, 8 pages.

Hochschild et al., "Cores that don't count," In Proceedings of the Workshop on Hot Topics in Operating Systems (pp. 9-16), 8 pages total, Jun. 2021.

IONA Technologies PLC, "iPortal Application Server Developer's Guide," Internet Citation, Oct. 1, 2001, retrieved from: http://www.iona.com/support/docs/iportal_application_server/3.0/DevelopGuide/pdf/ipas30_developguide.pdf.

Luiz Barroso et al., "Attack of the Killer Microseconds," downloaded on Sep. 21, 2022, from [https://cacm.acm.org/magazines/2017/4/215032-attack-of-the-killer-microseconds/fulltext], 8 pages.

Rosenfeld, K., et al., "Attacks and Defenses for JTAG," IEEE Design & Test of Computers, IEEE Service Center, New York, NY, US, vol. 27, No. 1, Jan. 1, 2020.

Valea et al., "Encryption-Based Secure JTAG," 2019, Montpelier, France, Univ. Grenoble, 6 pages.

U.S. Appl. No. 17/957,977, filed Sep. 30, 2022, Sudhanshu Shukla.

Intel Select Solutions for HPC & AI Converged Clusters [Magpie*], Solution Brief, Intel Select Solutions High Solutions High Performance Computing and AI, May 2019.

B. Sinharoy et al. "IBM POWER8 processor core microarchitecture," IBM J. Res. & Dev. vol. 59 No. 1 Paper 2 Jan./Feb. 2015, 21 pages.

C.-L. K. Shum et al., "Design and microarchitecture of the IBM System z10 microprocessor," IBM J. Res. & Dev. vol. 53 No. 1 Paper 1 2009, 12 pages.

Chen et al. "Eyeriss: An Energy-Efficient Reconfigurable Accelerator for Deep Convolutional Neural Networks," in ISSCC 2016, IEEE International Solid-State Circuits Conference, Jan. 31-Feb. 4, 2016, 4 pages.

European Examination Report for application No. 22208089.7, issued Jan. 18, 2024, 4 pages.

Extended European Search Report for EP20163972.3 dated Sep. 24, 2020.

Final Office Action for U.S. Appl. No. 16/905,914, mailed Feb. 27, 2024, 16 pages.

Google translation of CN108011883A (May 8, 2018 Publication of CN108011883A, 8 pages) (Year: 2018).

Non-final Office Action for U.S. Appl. No. 17/357,963, mailed Apr. 9, 2024, 16 pages.

Notice of Allowance issued in U.S. Appl. No. 17/409,090, issued Oct. 30, 2024, 10 pages.

Notice of Allowance issued in U.S. Appl. No. 17/028,387, issued Mar. 27, 2024, 10 pages.

Office Action issued in U.S. Appl. No. 17/357,951, on Sep. 25, 2024, 11 pages.

Office Action issued in U.S. Appl. No. 17/479,582, mailed on Sep. 30, 2024, 11 pages.

Resubmission: SPEC CPU2006 Platform Settings for Lenovo Systems, downloaded from https://www.spec.org/cpu2006/flags/Lenovo-Platform-Flags-V1.2-SKL-..., on Sep. 7, 2021, 3 pages.

(56) References Cited

OTHER PUBLICATIONS

Rosenfeld et al., "Attacks and Defenses for JTAG," Politechnic Institute of New York University, Jan./Feb. 2010, 12 pages.

Valea Emanuele et al., "Encryption-Based Secure JTAG," 2019 IEEE 22nd International Symposium on Design and Diagnostics of Electronic Circuits and Systems (DDECS), IEEE, Apr. 24, 2019.

Extended European Search Report for application No. 22208089.7, issued Apr. 28, 2023, 7 pages.

GB Examination Report and Notification of Intention to Grant counterpart GB application GB21111963.1, Jun. 28, 2022, 2 pages.

International Search Report (PCT/US2022/037037), issued Oct. 27, 2022, 4 pages.

International Search Report for PCT/US2011/053317, published Mar. 29, 2012, 4 pages.

Notice of Allowance from application No. 2028988 filed in NL, issued Jul. 29, 2022, 1 page (including Google machine translation). together with allowed claims in English, 3 pages.

Chen et al, "Using Dataflow o Optimize Energy Efficiency of Deep Neural Network Accelerators," IEEE Micro, IEEE Computer Society, May/Jun. 2017, 10 pages.

Chromium Blog: Efficient And Safe Allocations Everywhere!, downloaded from "https://blog.chromium.org/2021/04/ efficient-and-safe-allocations-everyw," on Jun. 22, 2021, 6 pages.

Farooq, M. Umar, and Lizy K. John. "Store-load-branch (slb) predictor: A compiler assisted branch prediction for data dependent branches." High Performance Computer Architecture (HPCA2013), 2013 IEEE 19th International Symposium on. IEEE, 2013.

HPC Cluster Tuning on 3rd Generation Intel Xeon Scalable Processors, Intel Optimization Guide, High Performance Computing Intel Xeon Scalable Processor, 10 pages.

IBM T. J. Watson Research Center, "IBM T. J. Watson Research Center," downloaded from https://ieeexplore.ieee.org/xpl/tocresult. jsp?isnumber=7175088 on Aug. 24, 2020, 6 pages.

Ioana Burcea et al., "Phantom-BTB: A Virtualized Branch Target Buffer Design," ASPLOS'09, Mar. 7-11, 2009, 11 pages.

Alves et al., "Early Address Prediction: Efficient Pipeline Prefetch and Reuse," ACM Transactions on Architecture and Code Optimization, vol. 18, No. 3, Jun. 8, 2021, 22 pages.

European Search Report for application No. EP 22206883, Jun. 12, 2023, 11 pages.

European Search Report for European Patent Application No. 22 183 309.8, issued Dec. 23, 2022, 11 pages.

* cited by examiner

Figure 3:
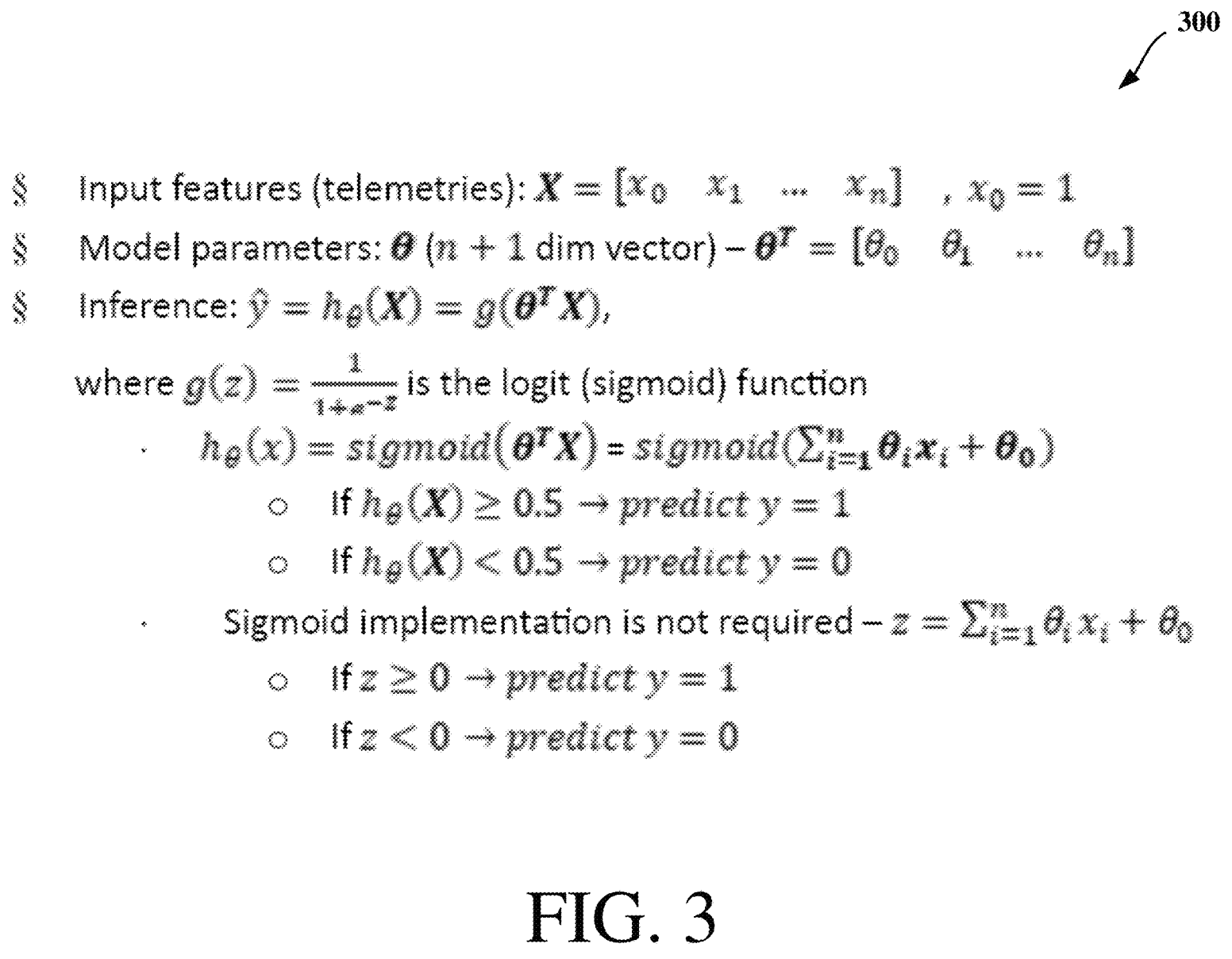

300

- Input features (telemetries): $X = [x_0 \quad x_1 \quad \cdots \quad x_n]$ , $x_0 = 1$
- Model parameters: $\theta$ ($n + 1$ dim vector) $- \theta^T = [\theta_0 \quad \theta_1 \quad \cdots \quad \theta_n]$
- Inference: $\hat{y} = h_\theta(X) = g(\theta^T X)$, where $g(z) = \frac{1}{1 + e^{-z}}$ is the logit (sigmoid) function

- $h_\theta(x) = sigmoid(\theta^T X) = sigmoid(\sum_{i=1}^{n} \theta_i x_i + \theta_0)$
  - If $h_\theta(X) \geq 0.5 \rightarrow predict\ y = 1$
  - If $h_\theta(X) < 0.5 \rightarrow predict\ y = 0$

- Sigmoid implementation is not required $- z = \sum_{i=1}^{n} \theta_i x_i + \theta_0$
  - If $z \geq 0 \rightarrow predict\ y = 1$
  - If $z < 0 \rightarrow predict\ y = 0$

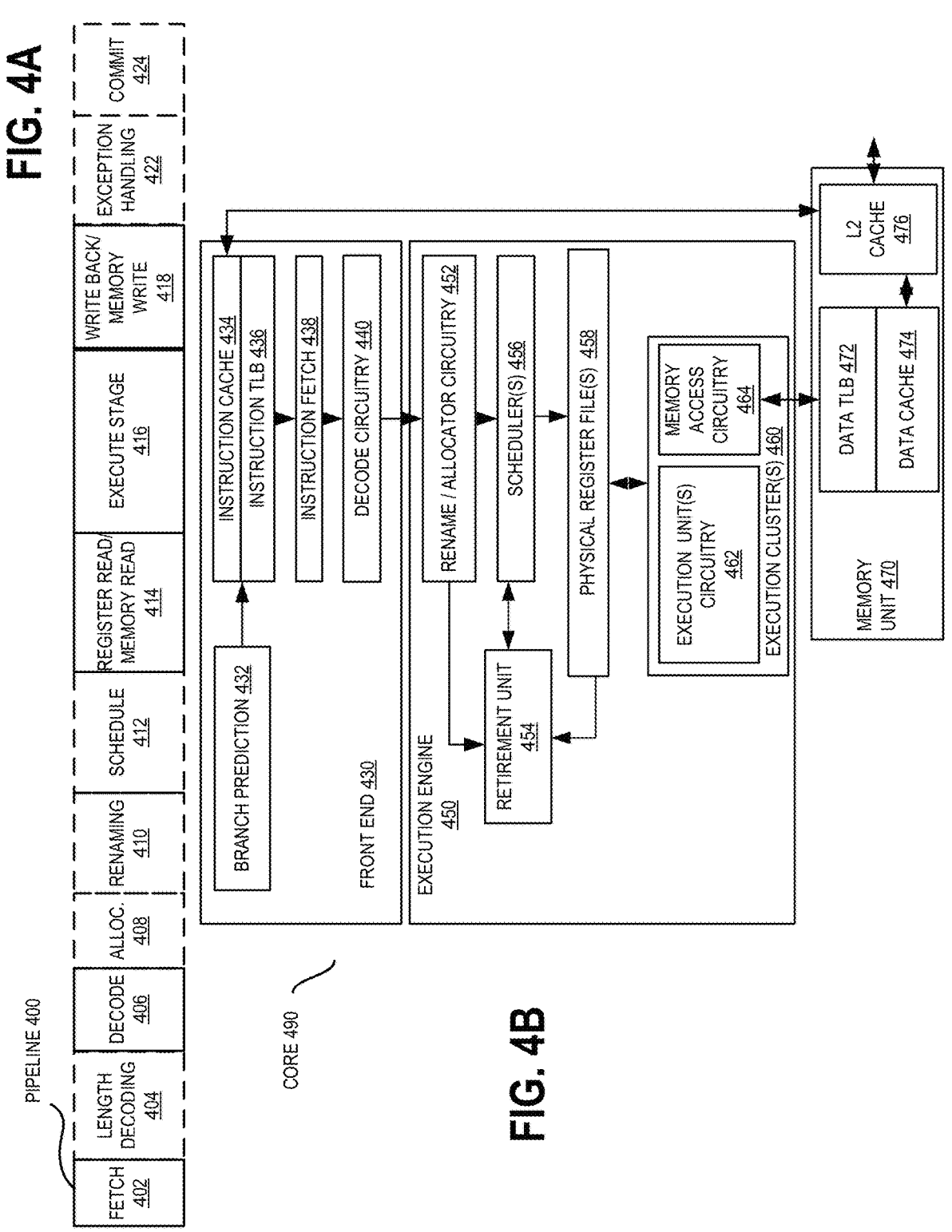

PIPELINE 400

| FETCH 402 | LENGTH DECODING 404 | DECODE 406 | ALLOC. 408 | RENAMING 410 | SCHEDULE 412 | REGISTER READ/ MEMORY READ 414 | EXECUTE STAGE 416 | WRITE BACK/ MEMORY WRITE 418 | EXCEPTION HANDLING 422 | COMMIT 424 |

FIG. 4B

CORE 490

FRONT END 430

BRANCH PREDICTION 432

INSTRUCTION CACHE 434

INSTRUCTION TLB 436

INSTRUCTION FETCH 438

DECODE CIRCUITRY 440

EXECUTION ENGINE 450

RENAME / ALLOCATOR CIRCUITRY 452

RETIREMENT UNIT 454

SCHEDULER(S) 456

PHYSICAL REGISTER FILE(S) 458

EXECUTION CLUSTER(S) 460

EXECUTION UNIT(S) CIRCUITRY 462

MEMORY ACCESS CIRCUITRY 464

MEMORY UNIT 470

DATA TLB 472

DATA CACHE 474

L2 CACHE 476

900

DYNAMIC INCLUSIVE AND NON-INCLUSIVE CACHING POLICY

FIELD

The present disclosure generally relates to the field of computer processors. More particularly, an embodiment relates to a dynamic inclusive and non-inclusive caching policy.

BACKGROUND

In computing, a "cache" generally refers to a hardware or software component that stores data for faster future accesses. Various caching policies may be used, e.g., to tradeoff between various characteristics such as speed, power consumption, or data correctness. Hence, a caching policy can have a direct impact on computing speed as well as power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 3 illustrates a sample logistic regression model that may be used to implement a machine learning model, according to an embodiment.

FIG. 4A is a block diagram illustrating both an exemplary in-order pipeline and an exemplary register renaming, out-of-order issue/execution pipeline according to embodiments.

FIG. 4B is a block diagram illustrating both an exemplary embodiment of an in-order architecture core and an exemplary register renaming, out-of-order issue/execution architecture core to be included in a processor according to embodiments.

DETAILED DESCRIPTION

Figure 1:
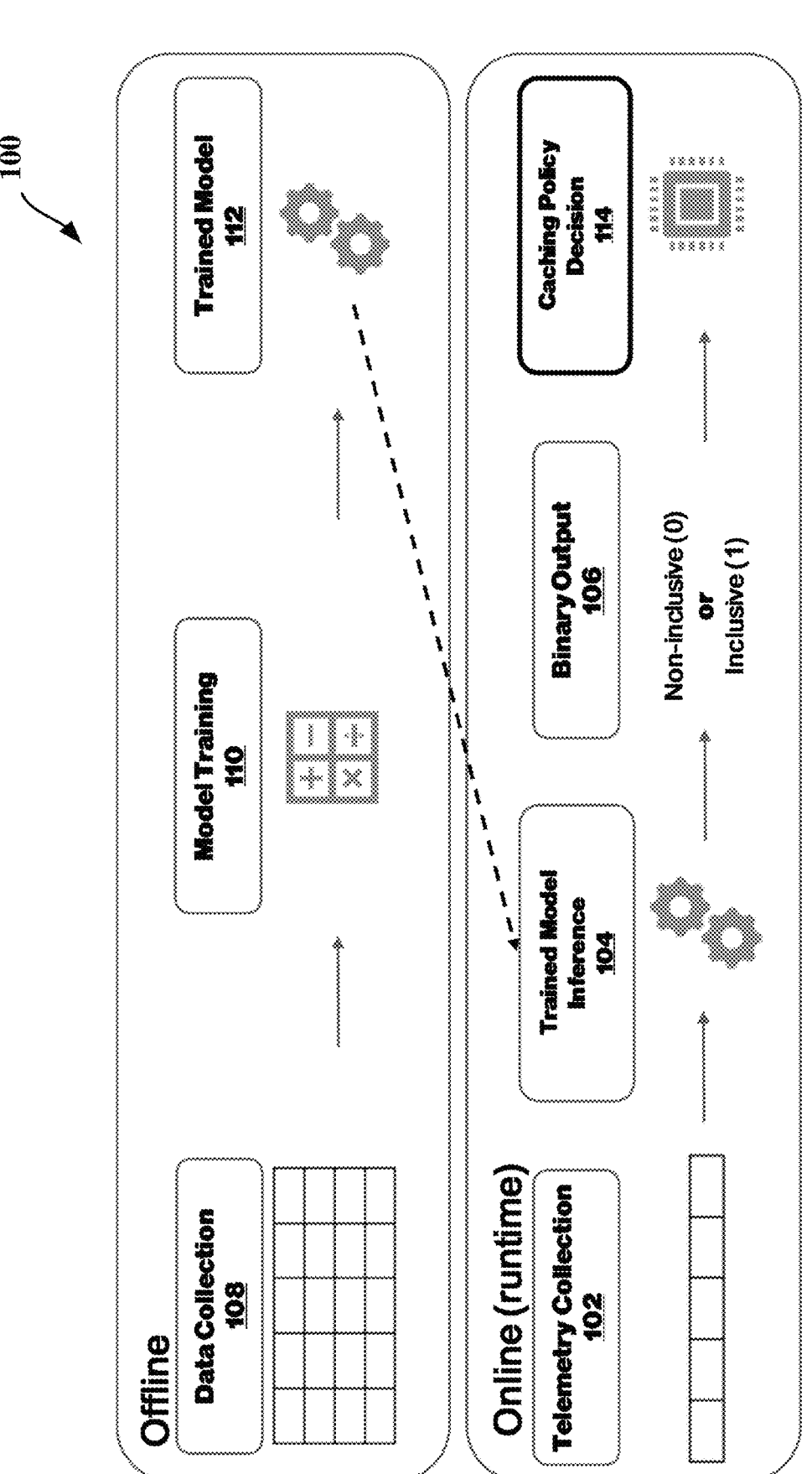
FIG. 1 illustrates a flow diagram of method for dynamic determination of caching policies, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, a caching policy can have a direct impact on computing speed as well as power consumption. Generally, a caching policy between different levels of caches (e.g., between a Mid-Level Cache (MLC) such as a Level 2 (L2) cache and a Last Level Cache (LLC) such as Level 3 (L3) cache) can be statically either inclusive (sometimes called "non-exclusive") or Non-Inclusive (or NI, sometimes called "exclusive"). An inclusive caching policy means/ensures that any cache line that is present in the lower-level cache (e.g., MLC) needs to also be present in the higher level (inclusive) cache (e.g., LLC). In a non-inclusive caching policy, data in the lower-level cache (e.g., MLC) may or may not be present in the higher-level cache (e.g., LLC). Hence, there is no requirement that the address will be in the higher-level cache (e.g., LLC). The NI caching policy may allow for a higher-level cache size increase without limiting the size of the lower level cache.

However, a caching policy has clear performance tradeoffs. One notable tradeoff is the clean writeback bandwidth (BW). Since in NI caching policy, cache lines brought to the core bypass the higher level cache directly to the lower level cache, the lower level cache needs to writeback clean cache lines (e.g., in E or F states, where "E" refers to an exclusive state and "F" refers to a state indicating that a cache should act as a designated responder for any requests for a given cache line) on evictions or risk memory latency the next time that cache line is requested. This significantly increases the traffic between lower and higher-level caches (e.g., between MLC and LLC) compared to an inclusive caching policy, where clean lines can be dropped as they are already stored in the higher-level cache (e.g., LLC). Currently, the option to decide between the NI and inclusive caching polices is static and there is no option to choose and adjust the mode dynamically.

Moreover, due to the continuing increase in the number of processor cores and the dependency between lower-level cache and higher-level cache sizes, some computing systems implement the non-inclusive mode, which increases the overhead for clean cache lines writeback bandwidth, even if working with a subset of the (e.g., active) processor cores. Using only the NI caching policy may also reduce performance where an inclusive caching policy would be more beneficial. For example, when only a small number of processor cores are active, an inclusive caching policy can be more suitable and can save memory traffic improving performance without affecting the capacity of the inclusive cache (e.g., LLC). This is not an option in a static caching policy mode.

To this end, some embodiments provide a dynamic inclusive and non-inclusive caching policy. An embodiment allows for dynamic selection of the best inclusiveness caching policy during runtime. For example, an inclusive policy is chosen during runtime where the number of active processor cores compared with (e.g., is less than) a predefined threshold value. In one embodiment, a machine learning process analyzes and defines the inclusivity state of the caches (e.g., by determining the predefined threshold value) between an NI or inclusive caching policy, for example, based on telemetry data.

Moreover, dynamic selection of inclusive or NI caching policy may improve Single Threaded (ST) performance, as well as improve Multi-Threaded (MT) performance when a small number of active processor cores (e.g., 8 or less) are present. The performance gain may be the result of reduction in the clean writeback operations between two different levels of cache (e.g., between MLC and LLC). In addition, in inclusive mode, the lower-level cache may flush only modified (M) lines, which leads to faster power consumption state (e.g., c6) entry flow for processor cores that wake up and go back to sleep quickly. Additional performance gains may also be realized by Inter-Die Interface (IDI) bandwidth reduction and/or frequency scaling. For example, dynamic selection of inclusive or NI caching policy may provide gains of approximately 1% instructions per cycle (IPC).

Conceptually, with a lower number of active cores, the benefits of NI diminish and the overhead of clean writebacks grow with limited external request tracker size. With few active cores, the ratio of higher-level cache (e.g., LLC) capacity to active core cache capacity is large, so the additive capacity of NI provides a lower benefit. At the same time, the potential memory bandwidth per processor core can be much higher, and outstanding request tracker occupancy may become a significant bottleneck.

Figure 2:
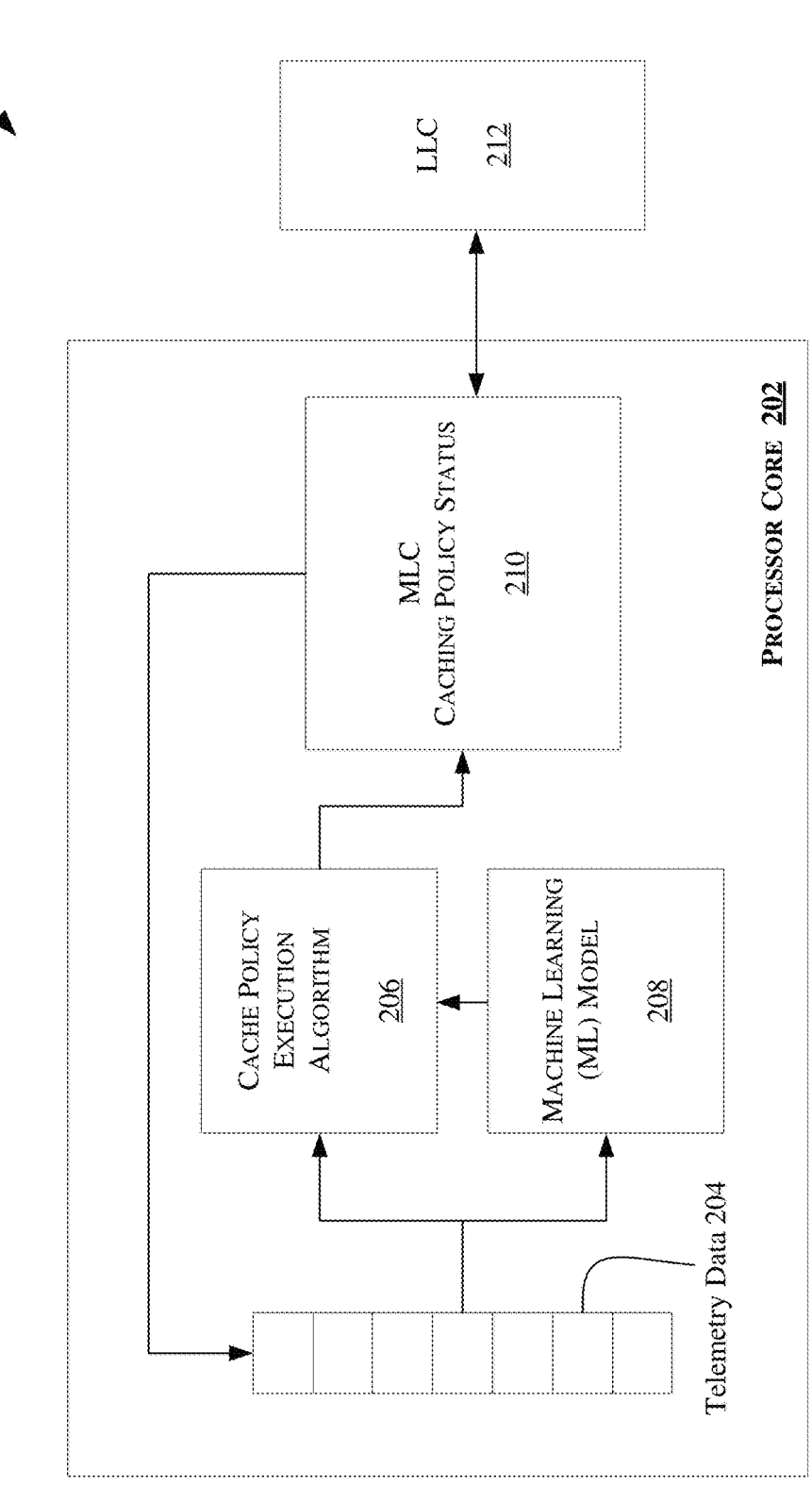
FIG. 2 illustrates a block diagram of a system to provide dynamic determination of caching policies, according to an embodiment.

FIG. 1 illustrates a flow diagram of method 100 for dynamic determination of caching policies, according to an embodiment. FIG. 2 illustrates a block diagram of a system 200 to provide dynamic determination of caching policies, according to an embodiment. System 200 includes a processor core 202 which in turn includes a telemetry data storage 204, caching policy execution circuitry 206, Machine Learning (ML) model logic circuitry 208, an MLC caching policy status 210. The MLC caching policy status 210 is used for communication with an LLC 212. In some embodiments, one or more of the processor cores discussed with reference to FIGS. 4A-10 may include one or more components of the processor core 202.

Referring to FIGS. 1 and 2, at an operation 102, during runtime, a processor core (e.g., processor core 202) samples the memory telemetry data (e.g., telemetry data 204) for a given period of time. The collected telemetry data is used as input features to a ML binary classification model (e.g., ML model logic circuitry 208) at an operation 104. The ML model logic circuitry 208 predicts if the caching policy should be either inclusive (e.g., as a 1) or non-inclusive (e.g., as a 0) at operation 106). The caching policy decision 114 is then provided to the caching policy execution circuitry 206 to impact the MLC caching policy status 210.

In an embodiment, the training of the model for operation 104 may be done offline, by collecting telemetry data as input features at an operation 108, as well as the best caching policy for a given implementation, i.e., the label, for each given time, for several different workloads. During the training process at an operation 110, the parameters which maximize the model's accuracy are determined. At an operation 112, the trained model is determined and loaded into a processor core to make predictions during runtime (i.e., at operation 104, based on collected telemetry data of operation 102. During the inference process the model uses the input features to predict the best caching policy, i.e., inclusive or non-inclusive. Also, while operations 108, 110, and 112 are shown to be performed offline, embodiments are not limited to this and one or more of these operations may be performed during runtime depending on the implementation. In an embodiment, a user performs the operations 108, 110, and 112 per their workloads or in the field.

In some embodiments, the telemetry data (e.g., data 204) of operation 102 is gathered from several places in the processor core and/or the System On Chip (SOC) device that includes the processor core. The telemetry data may include statistic data of a core and memory behavior, and/or telemetry data sent from SOC (for example: active core count). Telemetry data may be used for a caching policy decision at operation 114 to select the best caching policy mode and/or for general statistical use to train the ML model to improve the decision algorithm.

FIG. 3 illustrates a sample logistic regression model 300 that may be used to implement a machine learning model, according to an embodiment. A logistic regression model may be selected, in part, because it is simple to implement and consumes relatively little memory.

In one embodiment, a logistic regression is a binary classification model where a linear combination of the independent variables (e.g., the features/telemetries) is used to predict the dependent variable(s) (e.g., the binary label, 0/1, non-inclusive/inclusive, respectively).

In an embodiment, a sigmoid transformation (the logit function g(z)) is applied on the linear combination result to receive the predicted probability for class 1. A probability threshold different than 0.5 may be selected and the decision boundary threshold may then be set accordingly. In some embodiments, the telemetry used includes cache telemetry data such as the number of stalls, queue occupancy (e.g., reflecting the number of external memory fetch requests; hence, if the queue is full, there may be many requests pending and/or the fabric (e.g., in the SOC or processor) is limiting), and cache pre-fetcher data (e.g., which generally refers to data that is predicted to be used and may be prefetched to be ready for use), etc.

Additionally, some embodiments may be applied in computing systems that include one or more processors (e.g., where the one or more processors may include one or more processor cores), such as those discussed with reference to FIG. 1 et seq., including for example a desktop computer, a workstation, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

FIG. 4A is a block diagram illustrating both an exemplary in-order pipeline and an exemplary register renaming, out-of-order issue/execution pipeline according to embodiments. FIG. 4B is a block diagram illustrating both an exemplary embodiment of an in-order architecture core and an exemplary register renaming, out-of-order issue/execution architecture core to be included in a processor according to embodiments. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a writemask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 6) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

Figure 5:
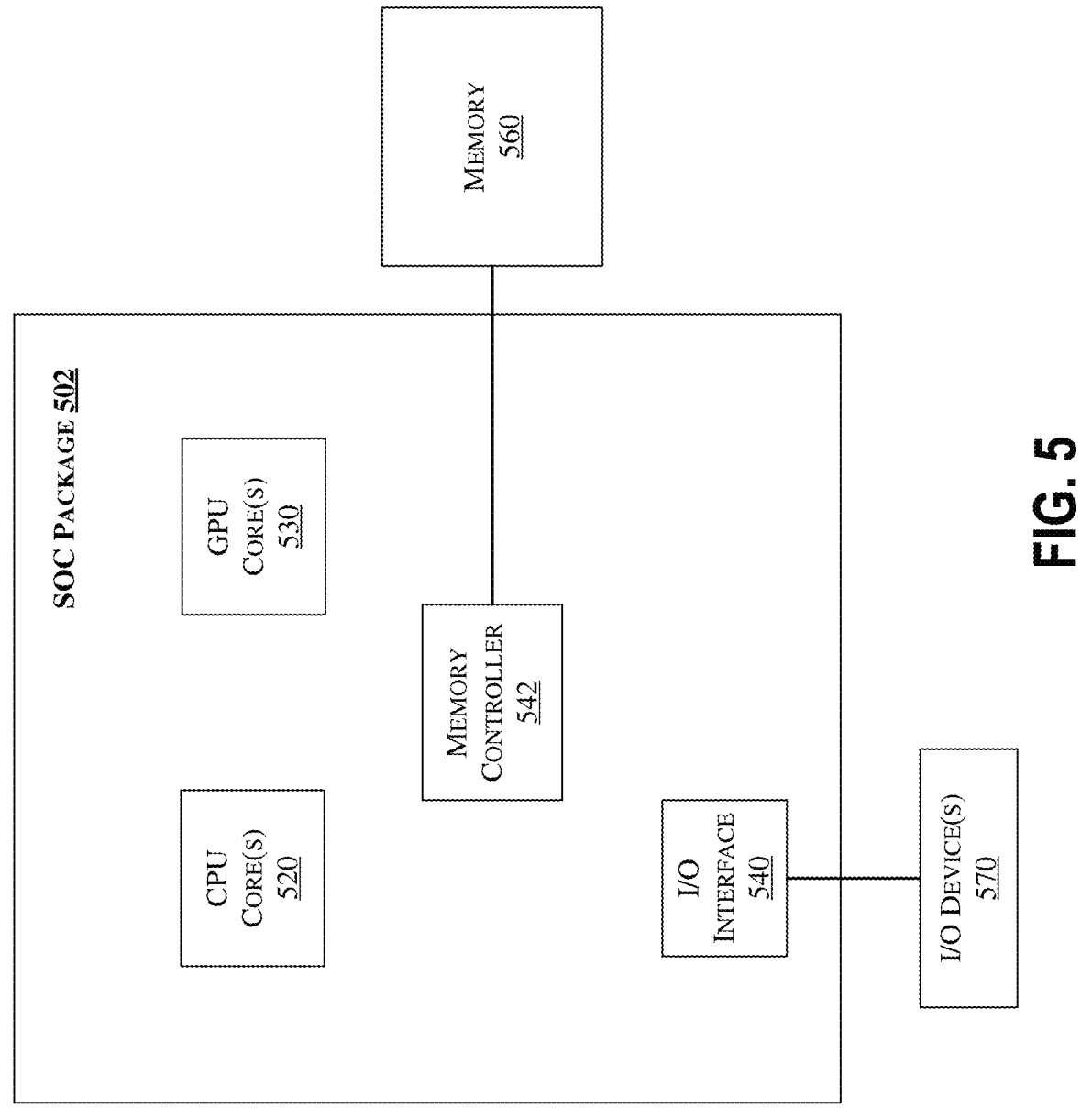
FIG. 5 illustrates a block diagram of an SOC (System On Chip) package in accordance with an embodiment.

FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 502 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like.

Figure 6:
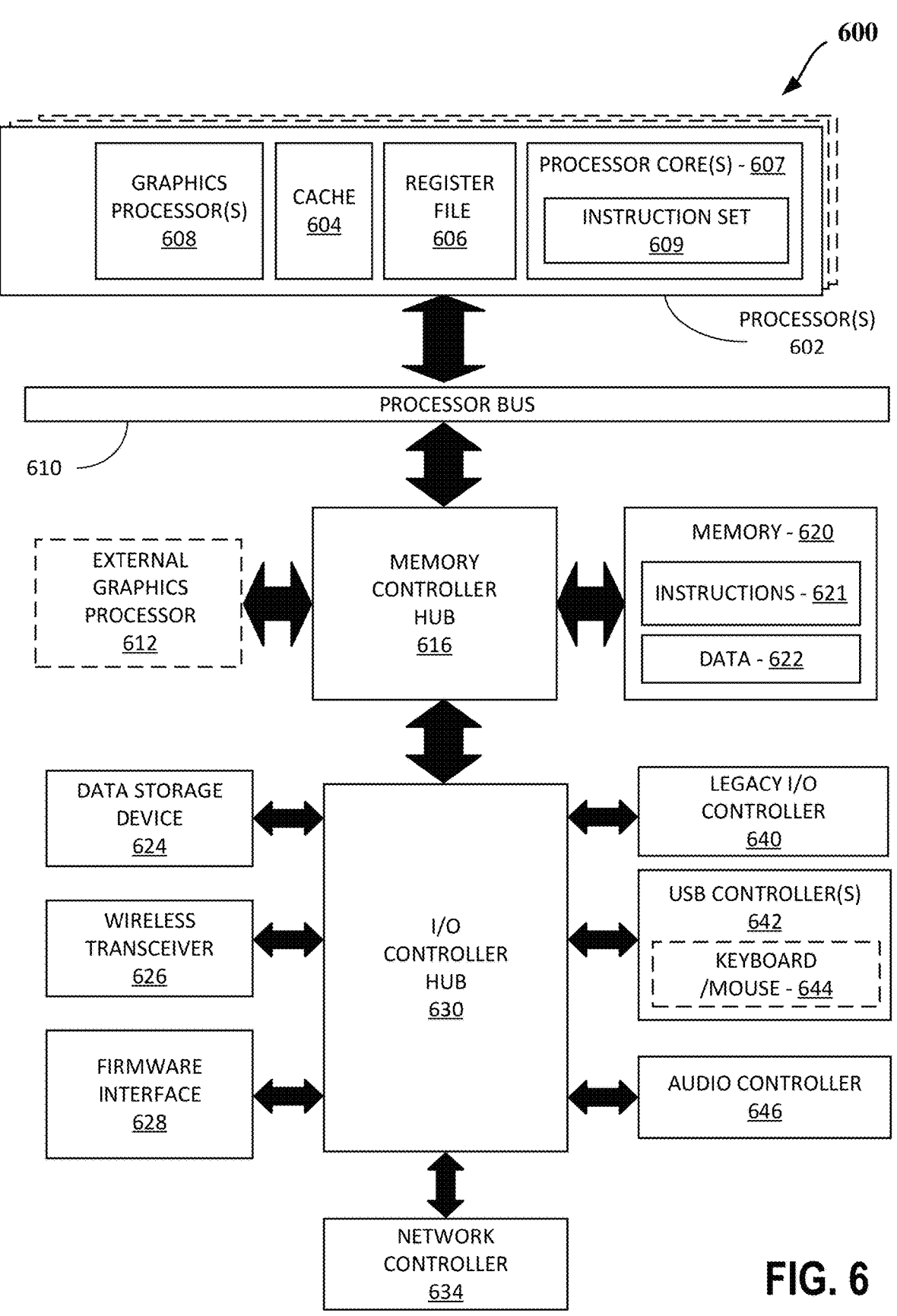
FIG. 6 is a block diagram of a processing system, according to an embodiment.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
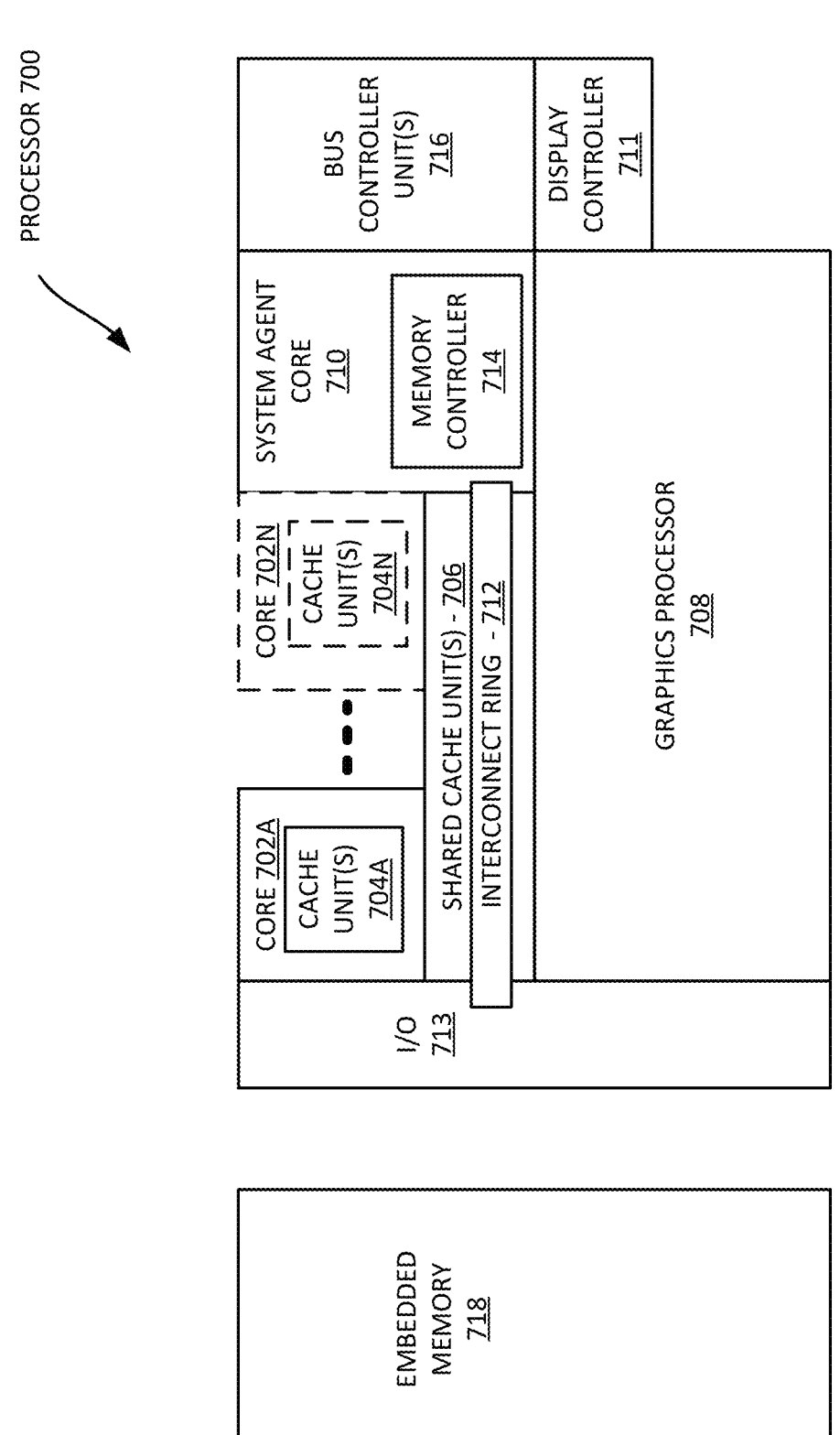
FIG. 7 is a block diagram of an embodiment of a processor having one or more processor cores, according to some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

Figure 8:
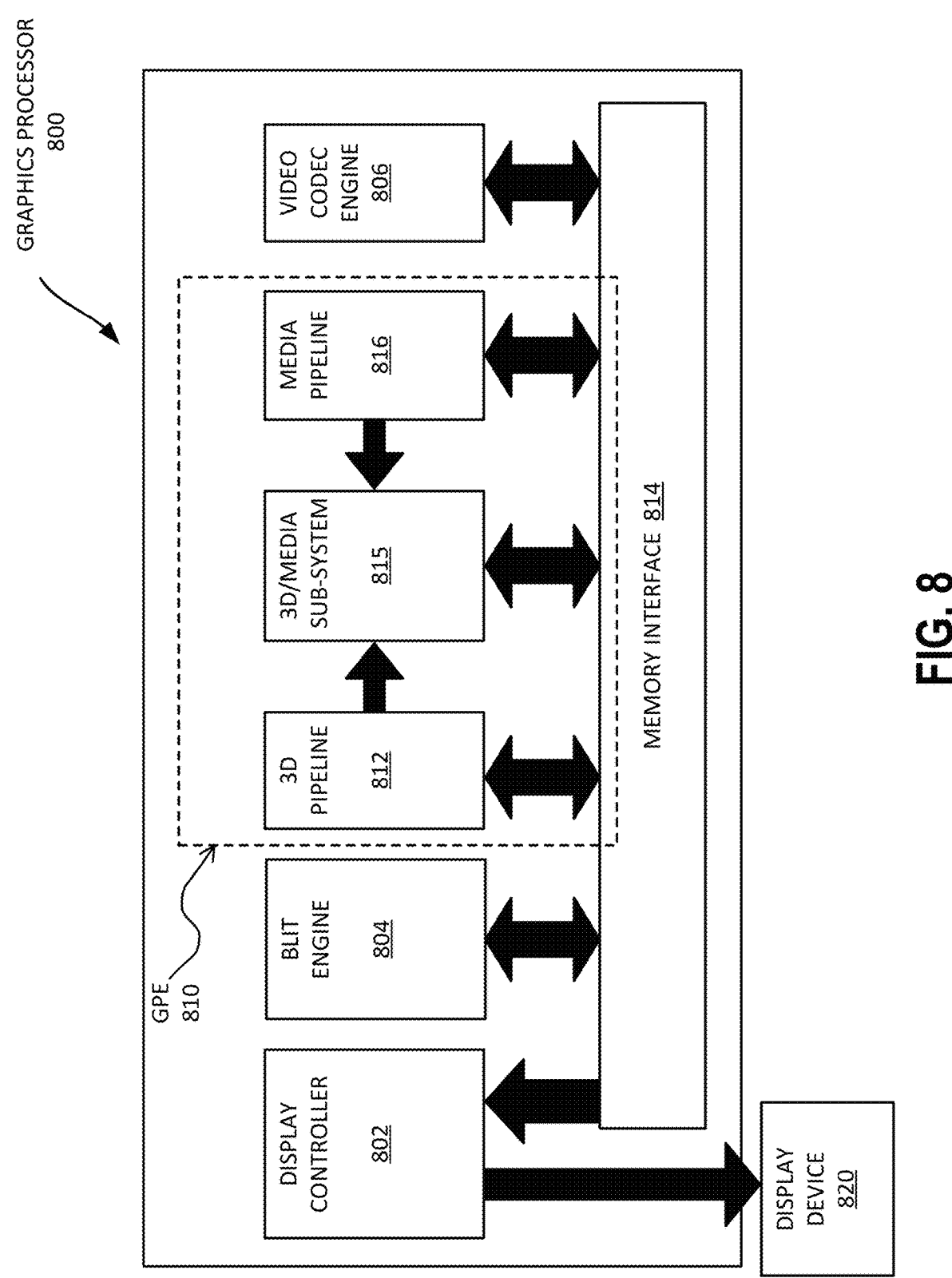
FIG. 8 is a block diagram of a graphics processor, according to an embodiment.

FIG. 8 is a block diagram of a graphics processor 800, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 800 includes a memory interface 814 to access memory. Memory interface 814 can be an interface to local memory, one or more internal caches, one or more shared external caches, and/or to system memory.

In some embodiments, graphics processor 800 also includes a display controller 802 to drive display output data to a display device 820. Display controller 802 includes hardware for one or more overlay planes for the display and composition of multiple layers of video or user interface elements. In some embodiments, graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 800 includes a block image transfer (BLIT) engine 804 to perform two-dimensional (2D) rasterizer operations including, for example, bit-boundary block transfers. However, in one embodiment, 3D graphics operations are performed using one or more components of graphics processing engine (GPE) 810. In some embodiments, graphics processing engine 810 is a compute engine for performing graphics operations, including three-dimensional (3D) graphics operations and media operations.

In some embodiments, GPE 810 includes a 3D pipeline 812 for performing 3D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While 3D pipeline 812 can be used to perform media operations, an embodiment of GPE 810 also includes a media pipeline 816 that is specifically used to perform media operations, such as video post-processing and image enhancement.

In some embodiments, media pipeline 816 includes fixed function or programmable logic units to perform one or more specialized media operations, such as video decode acceleration, video de-interlacing, and video encode acceleration in place of, or on behalf of video codec engine 806. In some embodiments, media pipeline 816 additionally includes a thread spawning unit to spawn threads for execution on 3D/Media sub-system 815. The spawned threads perform computations for the media operations on one or more graphics execution units included in 3D/Media sub-system 815.

In some embodiments, 3D/Media subsystem 815 includes logic for executing threads spawned by 3D pipeline 812 and media pipeline 816. In one embodiment, the pipelines send thread execution requests to 3D/Media subsystem 815, which includes thread dispatch logic for arbitrating and dispatching the various requests to available thread execution resources. The execution resources include an array of graphics execution units to process the 3D and media threads. In some embodiments, 3D/Media subsystem 815 includes one or more internal caches for thread instructions and data. In some embodiments, the subsystem also includes shared memory, including registers and addressable memory, to share data between threads and to store output data.

Artificial Intelligence

Figure 9:
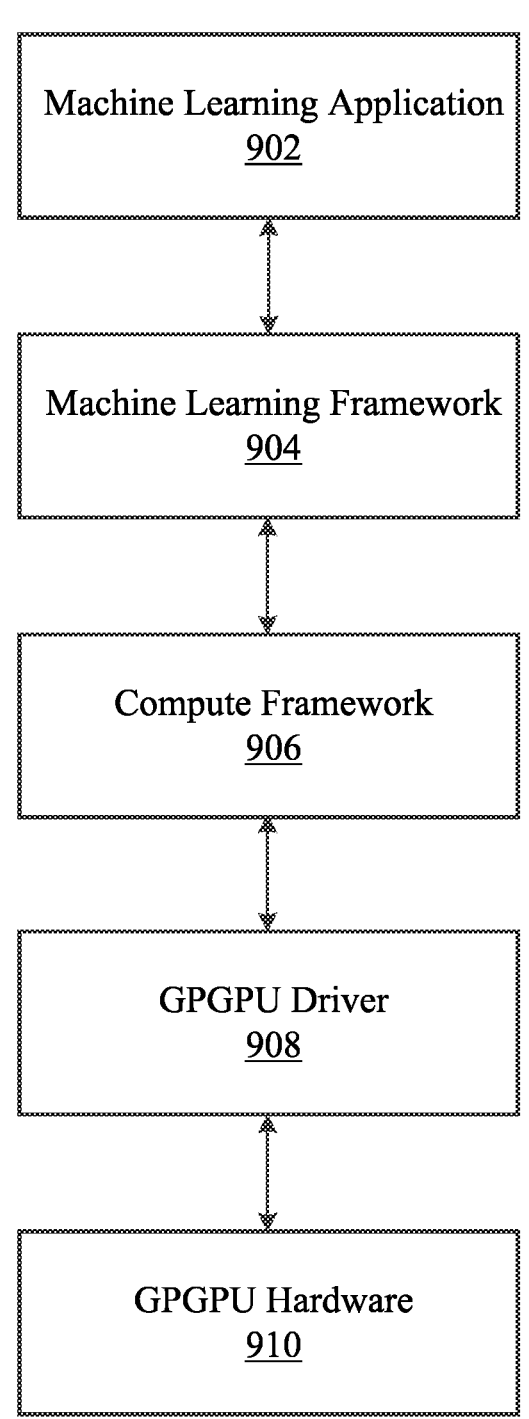
FIG. 9 illustrates a machine learning software stack, according to an embodiment.

One or more embodiments are aimed to address Artificial Intelligence (AI) specific security objectives by focusing on secure execution of AI operands including Convolutional Neural Network (CNN) or Deep Neural Network (DNN) convolution primitives in GPU without needing an intermediary. More particularly, FIG. 9 is a generalized diagram of a machine learning software stack 900. A machine learning application 902 can be configured to train a neural network or other similar supervised machine learning techniques using a training dataset or to use a trained deep neural network to implement machine intelligence. Moreover, while one or more embodiments are discussed herein with reference to heavy deep learning implementations, embodiments are not limited to such implementations and any supervised machine learning algorithm can be used, such as Bayesian Network (also referred to as Bayes Net), Random Forest, Logistic Regression, SVM (Support Vector Machine), Neural Network, Deep Neural Network, or any combinations thereof. The machine learning application 902 can include training and inference functionality for a neural network and/or specialized software that can be used to train a neural network before deployment. The machine learning application 902 can implement any type of machine intelligence including but not limited to image recognition, mapping and localization, autonomous navigation, speech synthesis, medical imaging, or language translation.

Hardware acceleration for the machine learning application 902 can be enabled via a machine learning framework 904. The machine learning framework 904 can provide a library of machine learning primitives. Machine learning primitives are basic operations that are commonly performed by machine learning algorithms. Without the machine learning framework 904, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 904. Exemplary primitives include tensor convolutions, activation functions, and pooling, which are computational operations that are performed while training a Convolutional Neural Network (CNN). The machine learning framework 904 can also provide primitives to implement basic linear algebra subprograms performed by many machine-learning algorithms, such as matrix and vector operations.

The machine learning framework 904 can process input data received from the machine learning application 902 and generate the appropriate input to a compute framework 906. The compute framework 906 can abstract the underlying instructions provided to the GPGPU driver 908 to enable the machine learning framework 904 to take advantage of hardware acceleration via the GPGPU hardware 910 without requiring the machine learning framework 904 to have intimate knowledge of the architecture of the GPGPU hardware 910. Additionally, the compute framework 906 can enable hardware acceleration for the machine learning framework 904 across a variety of types and generations of the GPGPU hardware 910.

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 10:
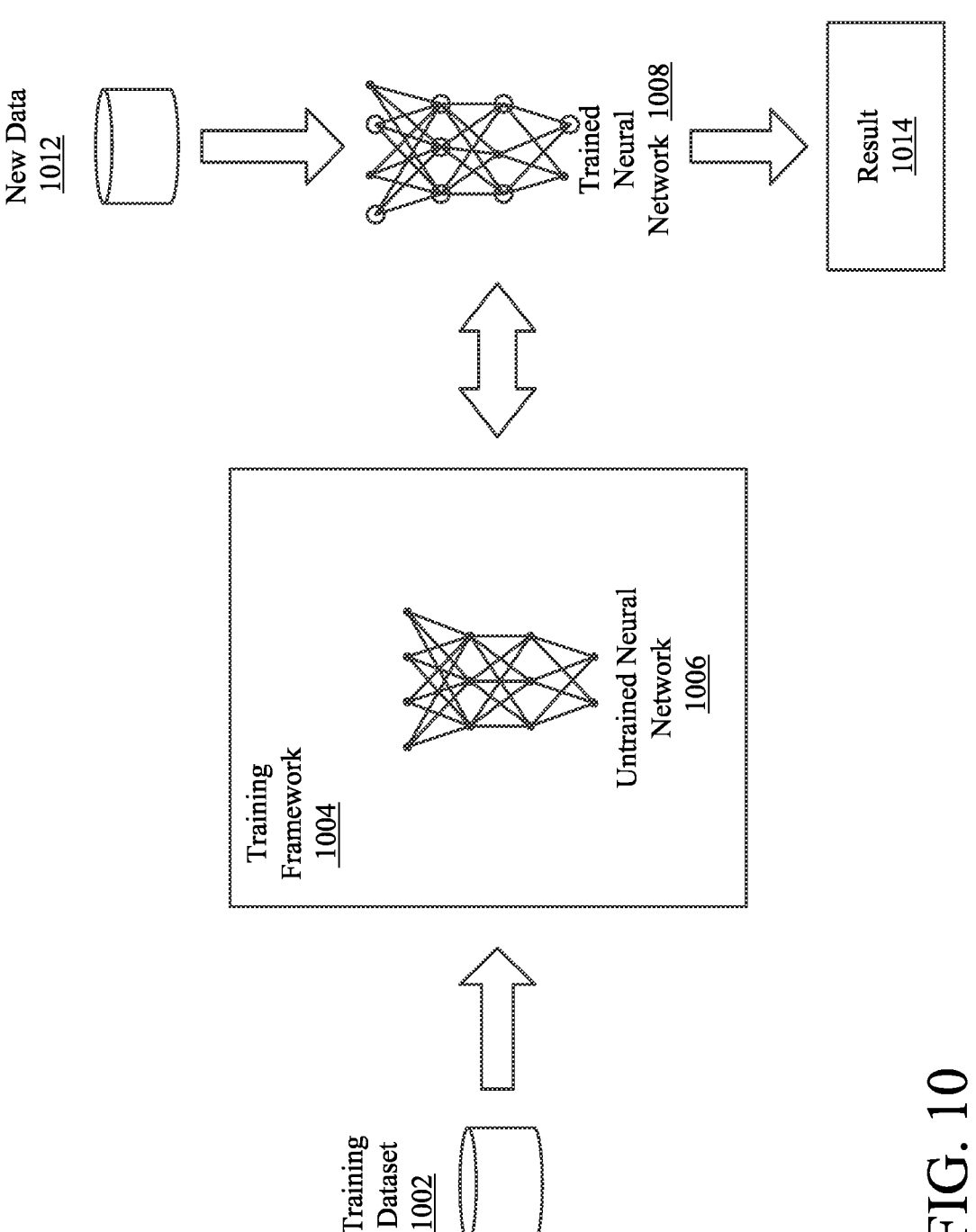
FIG. 10 illustrates training and deployment of a deep neural network.

FIG. 10 illustrates training and deployment of a deep neural network. Once a given network has been structured for a task the neural network is trained using a training dataset 1002. Various training frameworks have been developed to enable hardware acceleration of the training process. For example, the machine learning framework 904 of FIG. 9 may be configured as a training framework 1004. The training framework 1004 can hook into an untrained neural network 1006 and enable the untrained neural net to be trained using the parallel processing resources described herein to generate a trained neural network 1008. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1002 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1004 can adjust to adjust the weights that control the untrained neural network 1006. The training framework 1004 can provide tools to monitor how well the untrained neural network 1006 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1008. The trained neural network 1008 can then be deployed as result 1014 to implement any number of machine learning operations.

Unsupervised learning is a learning method in which the network attempts to train itself using unlabeled data. Thus, for unsupervised learning the training dataset 1002 will include input data without any associated output data. The untrained neural network 1006 can learn groupings within the unlabeled input and can determine how individual inputs are related to the overall dataset. Unsupervised training can be used to generate a self-organizing map, which is a type of trained neural network 1007 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1002 includes a mix of labeled and unlabeled data of the same distribution. Incremental learning is a variant of supervised learning in which input data is continuously used to further train the model. Incremental learning enables the trained neural network 1008 to adapt to the new data 1012 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: a first cache having a higher level than a second cache; and circuitry to determine a caching policy between the first cache and the second cache based at least in part on a comparison of a number of active processor cores and a threshold value, wherein the caching policy is one of an inclusive caching policy or a non-inclusive caching policy. Example 2 includes the apparatus of example 1, wherein the circuitry is to dynamically determine the caching policy during runtime. Example 3 includes the apparatus of example 1, comprising a machine learning model to determine the threshold value based on telemetry data. Example 4 includes the apparatus of example 3, wherein training of the machine learning model is to be performed offline. Example 5 includes the apparatus of example 3, wherein the telemetry data is to be collected during a selected period of time. Example 6 includes the apparatus of example 3, wherein the machine learning model is to operate in accordance with a logistic regression model. Example 7 includes the apparatus of example 3, wherein the telemetry data includes one or more of: statistic data of a processor core, statistic data of a storage device, and telemetry data sent from a System On Chip (SOC) device. Example 8 includes the apparatus of example 7, wherein the storage device comprises a cache, wherein the statistic data of the storage device includes a number of stalls, queue occupancy, and cache pre-fetcher data. Example 9 includes the apparatus of example 1, wherein the first cache comprises one or more of a Last Level Cache and a Level 3 (L3) cache. Example 10 includes the apparatus of example 1, wherein the second cache comprises one or more of a Mid-Level Cache (MLC) and Level 2 (L3) cache. Example 11 includes the apparatus of example 1, wherein the inclusive caching policy is to ensure that any cache line present in the second cache is also present in the first cache. Example 12 includes the apparatus of example 1, wherein the non-inclusive caching policy is to indicate that any cache line present in the second cache may but is not guaranteed to also be present in the first cache. Example 13 includes the apparatus of example 1, wherein the active processor cores are coupled to one or more of the first cache and the second cache. Example 14 includes the apparatus of example 1, wherein a processor, having one or more processor cores, comprises the circuitry and/or the second cache. Example 15 includes the apparatus of example 1, wherein a System On Chip (SOC) comprises one or more of: a processor, having one or more processor cores, the circuitry, the first cache, and the second cache.

Example 16 includes one or more non-transitory computer-readable media comprising one or more instructions that when executed on at least one processor configure the processor to perform one or more operations to cause: a first cache, having a higher level than a second cache, to store data; and circuitry to determine a caching policy between the first cache and the second cache based on a comparison of a number of active processor cores and a threshold value, wherein the caching policy is one of an inclusive caching policy or a non-inclusive caching policy. Example 17 includes the one or more computer-readable media of example 16, further comprising one or more instructions that when executed on the at least one processor configure the at least one processor to perform one or more operations to cause the circuitry to dynamically determine the caching policy during runtime. Example 18 includes the one or more computer-readable media of example 16, further comprising one or more instructions that when executed on the at least one processor configure the at least one processor to perform one or more operations to cause a machine learning model to determine the threshold value based on telemetry data. Example 19 includes the one or more computer-readable media of example 18, further comprising one or more instructions that when executed on the at least one processor configure the at least one processor to perform one or more operations to cause collection of the telemetry data during a selected period of time. Example 20 includes the one or more computer-readable media of example 18, further comprising one or more instructions that when executed on the at least one processor configure the at least one processor to perform one or more operations to cause the machine learning model to operate in accordance with a logistic regression model.

Example 21 includes a method comprising: causing a first cache, having a higher level than a second cache, to store data; and determining a caching policy between the first cache and the second cache based on a comparison of a number of active processor cores and a threshold value, wherein the caching policy is one of an inclusive caching policy or a non-inclusive caching policy. Example 22 includes the method of example 21, comprising dynamically determining the caching policy during runtime. Example 23 includes the method of example 21, further comprising determining, by a machine learning model, the threshold value based on telemetry data. Example 24 includes the method of example 23, further comprising collecting the telemetry data during a selected period of time. Example 25 includes the method of example 23, further comprising operating the machine learning model in accordance with a logistic regression model.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a first cache having a higher level than a second cache; and
circuitry to determine a caching policy between the first cache and the second cache based at least in part on a comparison of a number of active processor cores and a threshold value,
wherein the caching policy is one of an inclusive caching policy or a non-inclusive caching policy.

2. The apparatus of claim 1, wherein the circuitry is to dynamically determine the caching policy during runtime.

3. The apparatus of claim 1, comprising a machine learning model to determine the threshold value based on telemetry data.

4. The apparatus of claim 3, wherein training of the machine learning model is to be performed offline.

5. The apparatus of claim 3, wherein the telemetry data is to be collected during a selected period of time.

6. The apparatus of claim 3, wherein the machine learning model is to operate in accordance with a logistic regression model.

7. The apparatus of claim 3, wherein the telemetry data includes one or more of:
statistic data of a processor core, statistic data of a storage device, and telemetry data sent from a System On Chip (SOC) device.

8. The apparatus of claim 7, wherein the storage device comprises a cache, wherein the statistic data of the storage device includes a number of stalls, queue occupancy, and cache pre-fetcher data.

9. The apparatus of claim 1, wherein the first cache comprises one or more of a Last Level Cache and a Level 3 (L3) cache.

10. The apparatus of claim 1, wherein the second cache comprises one or more of a Mid-Level Cache (MLC) and Level 2 (2) cache.

11. The apparatus of claim 1, wherein the inclusive caching policy is to ensure that any cache line present in the second cache is also present in the first cache.

12. The apparatus of claim 1, wherein the non-inclusive caching policy is to indicate that any cache line present in the second cache may but is not guaranteed to also be present in the first cache.

13. The apparatus of claim 1, wherein the active processor cores are coupled to one or more of the first cache and the second cache.

14. The apparatus of claim 1, wherein a processor, having one or more processor cores, comprises the circuitry and/or the second cache.

15. The apparatus of claim 1, wherein a System On Chip (SOC) comprises one or more of: a processor, having one or more processor cores, the circuitry, the first cache, and the second cache.

16. One or more non-transitory computer-readable media comprising one or more instructions that when executed on at least one processor configure the processor to perform one or more operations to cause:
a first cache, having a higher level than a second cache, to store data; and
circuitry to determine a caching policy between the first cache and the second cache based on a comparison of a number of active processor cores and a threshold value,
wherein the caching policy is one of an inclusive caching policy or a non-inclusive caching policy.

17. The one or more computer-readable media of claim 16, further comprising one or more instructions that when executed on the at least one processor configure the at least one processor to perform one or more operations to cause the circuitry to dynamically determine the caching policy during runtime.

18. The one or more computer-readable media of claim 16, further comprising one or more instructions that when executed on the at least one processor configure the at least one processor to perform one or more operations to cause a machine learning model to determine the threshold value based on telemetry data.

19. The one or more computer-readable media of claim 18, further comprising one or more instructions that when executed on the at least one processor configure the at least one processor to perform one or more operations to cause collection of the telemetry data during a selected period of time.

20. The one or more computer-readable media of claim 18, further comprising one or more instructions that when executed on the at least one processor configure the at least one processor to perform one or more operations to cause the machine learning model to operate in accordance with a logistic regression model.

21. A method comprising:
causing a first cache, having a higher level than a second cache, to store data; and
determining a caching policy between the first cache and the second cache based on a comparison of a number of active processor cores and a threshold value, wherein the caching policy is one of an inclusive caching policy or a non-inclusive caching policy.

22. The method of claim 21, comprising dynamically determining the caching policy during runtime.

23. The method of claim 21, further comprising determining, by a machine learning model, the threshold value based on telemetry data.

24. The method of claim 23, further comprising collecting the telemetry data during a selected period of time.

25. The method of claim 23, further comprising operating the machine learning model in accordance with a logistic regression model.

* * * * *